United States Patent Office 3,560,496
Patented Feb. 2, 1971

---

3,560,496
2-BENZYL-as-TRIAZINE-3,5(2H,4H) DIONES
Harold L. Howes, Jr., and Richard C. Koch, New London, Conn., assignors to Chas. Pfizer & Co., Inc., New York, N.Y., a corporation of Delaware
No Drawing. Filed Oct. 16, 1968, Ser. No. 768,192
Int. Cl. C07d 55/10
U.S. Cl. 260—248                                    9 Claims

---

ABSTRACT OF THE DISCLOSURE 2-benzyl-as-triazine-3,5(2H,4H) diones and novel 2-substituted-benzyl-as-triazine-3,5(2H,4H) diones and their use as agents for the control of coccidiosis are described.

---

BACKGROUND OF THE INVENTION

Coccidiosis, a protozoan infection in young poultry, is known to have far-reaching economic effects. It is characterized by intestinal disorders, anemia, hemorrhage, and general unthriftiness. Two types of coccidiosis are known—the first, cecal, is caused by the coccidium *Eimeria tenella* and is characterized by severe hemorrhage on or about the fifth day after infection. The second type, intestinal, is caused by various species of Eimeria; namely, the *E. acervulina, E. necatrix, E. maxima, E. hagani, E. mitis, E. praecox*, and *E. brunetti*.

Extensive investigations into methods for controlling coccidiosis have led to the development of a wide variety of structural types of compounds such as sulfur, sulfa drugs, arsenicals, dihydro-1,3,5-triazines (U.S. Pat. 2,823,-161); 3-amino-as-triazine complexes with substituted ureas (U.S. Pat. 2,731,385); 1-phenyl-3-(3-as-triazinyl) ureas (U.S. Pat. 2,762,743); 5-fluorouracil (U.S. 3,017,322); and as-triazine - 3,5(2H4H) dione (U.S. Pat. 2,956,924) as coccidiostats.

The available agents are not completely satisfactory for the control of coccidiosis for one or more reasons. Many of these agents are relatively toxic and/or exhibit a low order of activity or possess a limited anticoccidial spectrum. Their effectiveness in suppressing or preventing the disease is frequently not high, and the high dosage levels required place an undue economic burden on the poultry grower.

SUMMARY OF THE INVENTION

It has now been found that a series of 2-benzyl-as-triazine-3,5(2H,4H) diones, having the general formula

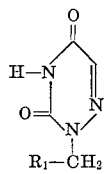

and the alkali metal and alkaline earth metal salts thereof wherein $R_1$ is selected from the group consisting of pentafluorophenyl, pentachlorophenyl, 3,4-methylenedioxyphenyl, and

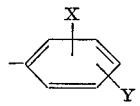

wherein

X is selected from the group consisting of hydrogen, halogen, lower alkoxy, nitro, trifluoromethyl, and cyano; and Y is selected from the group consisting of hydrogen, halogen, methyl, nitro, lower alkylsulfonyl, and trifluoromethyl;

are highly effective in controlling coccidiosis when orally administered in small doses to poultry. The terms "control" and "controlling"—as used herein—are intended to include the treatment; that is, the alleviation of symptoms, of established coccidial infections of poultry as well as the prevention (prophylaxis) of infection. However, because of the rapid clinical course of coccidial infections, the principal interest in these compounds resides in their use for the prevention of such infections.

The terms "lower alkyl" and "lower alkoxy"—as used herein—are intended to include alkyl and alkoxy groups having from one to four carbon atoms.

Of the variety of isomeric, homologous, and analogous benzyl-as-triazine-3,5(2H,4H) diones described in the art, it is only the 2-benzyl-as-triazine-3,5(2H,4H) diones, having the above formula, that are effective as agents for the control of coccidiosis. The isomeric 4- and 6-benzyl-as-triazine-3,5(2H,4H) diones are markedly less effective as coccidiostats than are the 2-benzyl derivatives of the above formula. Additionally, extension of the $R_1$—$CH_2$— moiety to $R_1$—$CH_2$—$CH_2$— also markedly reduces coccidiostatic activity. Maximum anticoccidial activity in the benzyl-as-triazine-3,5(2H,4H) diones resides in compounds having the above formula.

In addition to the compounds having the above formula, the corresponding 2-($\alpha$-methylbenzyl)-as-triazine-3,5(2H,4H) diones, wherein the 2-($\alpha$-methylbenzyl) group has the formula —$CH(CH_3)$—$R_1$ wherein $R_1$ is defined as above, are also effective as coccidiostats.

The compounds described herein may be administered to the poultry alone but are preferably administered in conjunction with a suitable inert carrier such as a nutritionally balanced poultry feed. Although the preferred route of administration is the oral route, it is also possible to administer these coccidiostatic compounds via the rectum. The compounds can, of course, as those skilled in the art will recognize, also be administered via the drinking water.

DETAILED DESCRIPTION OF THE INVENTION

The 2-benzyl-as-triazine-3,5(2H,4H) diones described herein are prepared by known methods such as are described by Novacek et al. in Coll. Czech. Chem. Communs. 30, 3890–3894 (1965). The most convenient method comprises direct benzylation of the parent compound, as-triazine-3,5(2H,4H) dione, known trivially as 6-azauracil. The general procedure comprises treatment of as-triazine-3,5(2H,4H) dione in a suitable solvent system in the presence of an acid acceptor with the appropriate benzyl chloride or bromide. Suitable solvents are water, ethylene glycol, N,N-dimethylformamide, dimethylsulfoxide, lower alkanols, N,N-dimethylacetamide, and tetramethylurea.

The molar proportion of reactants is not critical but can range from equimolar proportions up to a large excess of either reactant. In general, molar proportions of as-triazine-3,5(2H,4H) dione to benzyl chloride (or bromide) of from about 1:1 to about 1:2.0 are satisfactory.

The reaction temperature is not critical. In general, temperatures ranging from ambient temperature up to about 60° C. are favored. Higher temperatures or lower temperatures can, of course, be used but appear to offer no advantages. The reaction is generally conducted over a period of from about 2 to about 8 hours. Upon completion of the reaction, the reaction mixture is decolorized, if necessary, acidified to a pH of from about 3 to about 5, and cooled to precipitate the product. The product thus obtained is purified by methods known to those skilled in the art as, for example, by recrystallization from appropriate solvents, by chromatography on a suitable adsorbent, or by a combination of these methods.

Alternatively, these compounds are prepared by benzylation of glyoxylic acid semicarbazone in an aqueous medium or of a corresponding lower alkyl ester semicarbazone in ethylene glycol solution, followed by cyclization of the 2-benzyl semicarbazone derivative under the influence of sodium hydroxide in ethylene glycol solution. The cyclization reaction is conducted at a temperature of from about 100° to about 120° C. for a period of from about 2 to 4 hours. The product is recovered as described above.

In still another method of preparation, benzylidene semicarbazone is reacted with the appropriate benzyl chloride or bromide in the presence of an alkali metal (sodium or potassium) alkoxide to produce the corresponding 1-benzylidene-2-benzyl semicarbazone. Treatment of this compound with glyoxylic acid in aqueous sulfuric acid produces glyoxylic acid 2-benzyl semicarbazone which is then cyclized as described above.

A still further method comprises the conversion of as-triazine-3,5-(2H,4H) dione to its 3,5-bis(trimethylsilyl) ether by reaction with hexamethyldisilizane as is described by Durr et al., J. Heterocyclic Chem. 3, 226 (1966). The ether is then coupled with the appropriate benzyl halide, the trimethylsilyl groups removed from the alkylated ether by treatment with alcohol or alcohol and water, and the product recovered by known methods. In most instances, the product precipitates from the alcohol-water and is recovered by filtration.

The present agents may be orally administered to poultry in a suitable carrier therefor. It is generally convenient and therefore preferred to add the agents to the poultry feed so that a therapeutic dosage of the agent is ingested with the daily poultry ration. The agent may be added directly to the feed as such or in the form of a premix or concentrate. A premix or concentrate of therapeutic agent in a carrier is commonly employed for the inclusion of the agent in the feed. Suitable carriers are liquid or solid, as desired, such as water, various meals; for example, soybean oil meal, linseed oil meal, corncob meal, and mineral mixes such as are commonly employed in poultry feeds. A particularly effective carrier is the poultry feed itself; that is, a small portion of poultry feed. The carrier facilitates uniform distribution of the active materials in the finished feed with which the premix is blended. This is important because only small proportions of the present potent agents are required. It is important that the compound be throughly blended into the premix and, subsequently, the feed. In this respect, the agent may be dispersed or dissolved in a suitable oily vehicle, such as soybean oil, corn oil, cottonseed oil, and the like, or in a volatile organic solvent and then blended with the carrier. It will be appreciated that the proportions of active material in the concentrate are capable of wide variation since the amount of agent in the finished feed may be adjusted by blending the appropriate proportion of premix with the feed to obtain a desired level of therapeutic agent.

High potency concentrates may be blended by the feed manufacturer with proteinaceous carriers, such as soybean oil meal and other meals, as described above, to produce concentrated supplements which are suitable for direct feeding to poultry. In such instances, the poultry is permitted to consume the usual diet. Alternatively, such concentrated supplements may be added directly to the poultry feed to produce a nutritionally balanced, finished feed containing a therapeutically effective level of one or more of the compounds of this invention. The mixtures are thoroughly blended by standard procedures, such as in a twin shell blender, to ensure homogeneity. The finished poultry feed should contain roughly between 50% and 80% of grains, between 0% and 10% animal protein, between 5% and 30% vegetable protein, between 2% and 4% minerals, together with supplemental vitaminaceous sources.

It will, of course, be obvious to those skilled in the art that the use levels of the compounds described herein will vary under different circumstances. Continuous low-level medication during the growing period; that is, during the first 8 to 12 weeks for chickens, is an effective prophylactic measure. In the treatment of established infections, higher levels may be necessary to overcome the infection.

The present compounds may be employed at substantially low levels in feeds for the prevention or treatment of coccidiosis. Generally, the feed compositions of the present invention comprise a minor amount of the 2-benzyl-as-triazine compounds of this invention and a major amount of a nutritionally balanced feed as described above. Feed compositions containing as little as 0.0015% of the present agent are found to effectively combat coccidiosis. Large amounts of the agent, up to 0.1% and larger, may also be employed. Of course, concentrations of less than 0.0015% provide some control of the infection. The concentration range favored in feed compositions is from about 0.0015% to about 0.05%. The preferred range is from about 0.0015% to about 0.025% of the ration. When administered by incorporation into the drinking water, preferably as an alkali metal or alkaline earth salt, the hereindescribed compounds are used at levels one-half the dosage given above for feeds.

The present feed compositions and supplements may also contain other effective therapeutic agents, such as antibiotics to promote growth and general health of the poultry, as well as sulfa compounds which may increase the effectiveness of the present coccidiostats.

Additionally, compounds of the above formula, wherein at least one of the X and Y variables is selected from the group consisting of isonitrile, vinyl, lower alkanoyl, and —$CONR_2R_3$ wherein each of $R_2$ and $R_3$ is selected from the group consisting of hydrogen and lower alkyl, and $R_2$ together with $R_3$ and the nitrogen to which they are attached form a 5- or 6-membered ring such as pyrrolo, pyrrolidino, and piperidino, are also effective as agents for the prevention of coccidial infections. Further, analogous compounds wherein the phenyl moiety is trisubstituted, particularly at the 3, 4, and 5-positions, with substituents selected from the group consisting of halogen, nitro, cyano, methyl, lower alkoxy, trifluoromethyl, lower alkylsulfonyl, vinyl, isonitrile, lower alkanoyl, and —$CONR_2R_3$ are also valuable agents for the prevention of coccidial infections.

The following examples are given by way of illustration and are not to be considered as limitations of the present invention, many variations of which are possible without departing from the spirit or the scope thereof.

EXAMPLE I (A) 2-benzyl-as-triazine-3,5(2H,4H) dione.—To a solution of 6-azauracil (565 gms., 5.0 moles) and potassium hydroxide (1010 gms. of 85% KOH) in water (7.5 liters) is added dropwise, over a four-hour period, benzyl bromide (1000 gms., 5.9 moles) at a temperature of 55°–60° C. The mixture is maintained at this temperature for an additional four hours, then cooled and extracted with 3×250 ml. volumes of methylene chloride. It is then acidified to pH 3.5 with hydrochloric acid and the resulting precipitate collected, washed with water, and air dried. The product, purified by recrystallization from acetonitrile (7 liters), melts at 198°–200° C.

(B) The following compounds are prepared by the above procedure using the appropriate substituted benzyl chloride in place of benzyl bromide and the solvent system shown.

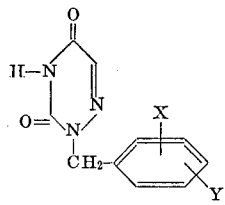

Example I

| X | Y | (° C.) M.P. | Solvent | Base |
|---|---|---|---|---|
| H | 3-NO$_2$ | 172 | Ethyleneglycol | KOH |
| H | 4-NO$_2$ | 212 | ....do.... | KOH |
| 4-CN | H | 209 | ....do.... | KOH |
| H | 2-Cl | 172 | Water | NaOH |
| H | 3-Cl | 179–181 | ....do.... | NaOH |
| H | 4-Cl | 234–236 | ....do.... | NaOH |
| H | 4-Br | 248–250 | ....do.... | NaOH |
| H | 3-F | 195–196 | ....do.... | NaOH |
| H | 4-F | 199–200 | ....do.... | NaOH |
| H | 3-CF$_3$ | 158–160 | ....do.... | NaOH |
| H | 2-F | 214–215 | ....do.... | NaOH |
| H | 2-CH$_3$ | 171–172 | ....do.... | NaOH |
| H | 4-CH$_3$ | 204–205 | ....do.... | NaOH |
| 2-Cl | 4-Cl | 207 | ....do.... | NaOH |
| 3-Cl | 4-Cl | 177 | ....do.... | NaOH |
| 2-F | 5-Cl | 203–204 | ....do.... | KOH |
| 2-Cl | 4-NO$_2$ | 199–200 | ....do.... | KOH |
| 2-F | 4-Cl | 215–216 | ....do.... | KOH |
| 4-F | 3-NO$_2$ | 198–200 | ....do.... | KOH |
| 4-Cl | 3-OCH$_3$ | 191–193 | ....do.... | KOH |
| 2-Cl | 5-OCH$_3$ | 162–163 | ....do.... | KOH |

EXAMPLE II

Repetition of the procedure of Example IA but using the appropriate benzyl chloride in place of benzyl bromide produces the following compounds: 2-(pentafluorobenzyl)- and 2-(pentachlorobenzyl) - as - triazine-3,5(2H,4H) diones and those having the formula

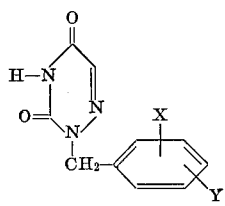

| X | Y | X | Y |
|---|---|---|---|
| 4-I | H | 2-CF$_3$ | 4-CF$_3$ |
| 4-OCH$_3$ | H | 2-CF$_3$ | 4-Cl |
| 3-OCH$_3$ | H | 2-CF$_3$ | 5-Br |
| 2-OCH$_3$ | H | 2-CF$_3$ | 4-I |
| 2-OC$_2$H$_5$ | H | 4-CF$_3$ | 2-F |
| 4-OC$_2$H$_5$ | H | 3-CF$_3$ | 5-NO$_2$ |
| 4-O-(n-C$_4$H$_9$) | H | 4-CN | 2-CF$_3$ |
| 2-NO$_2$ | H | 4-OCH$_3$ | 2-CF$_3$ |
| 2-CF$_3$ | H | 2-CF$_3$ | 4-CH$_3$ |
| H | 2-I | 5-OCH$_3$ | 2-Cl |
| 2-F | 3-F | 2-O-(n-C$_3$H$_7$) | 4-CF$_3$ |
| 2-F | 5-F | 4-OCH$_3$ | 3-NO$_2$ |
| 2-F | 4-F | 4-OC$_2$H$_5$ | 3-NO$_2$ |
| 2-Br | 4-Br | 3-Cl | 4-CH$_3$ |
| 3-NO$_2$ | 4-Cl | 2-Cl | 6-CH$_3$ |
| 4-NO$_2$ | 2-Br | 4-Br | 2-CH$_3$ |
| 3-NO$_2$ | 4-I | 2-I | 4-CH$_3$ |
| 4-CN | 3-NO$_2$ | 3-NO$_2$ | 4-CH$_3$ |
| 2-CN | 4-NO$_2$ | 2-OCH$_3$ | 6-CH$_3$ |
| 2-CN | 4-CH$_3$ | H | 4-CH$_3$ |
| 3-NO$_2$ | 4-NO$_2$ | 2-F | 5-NO$_2$ |
| 2-Br | 4-SO$_2$CH$_3$ | 4-Cl | 2-SO$_2$CH$_3$ |
| 4-CF$_3$ | 3-SO$_2$CH$_3$ | 4-CN | 2-SO$_2$CH$_3$ |
| 3-NO$_2$ | 4-SO$_2$C$_2$H$_5$ | | |

EXAMPLE III 2-(3,5-bis-trifluoromethylbenzyl)-
as-triazine-3,5(2H,4H) dione

A mixture of 6-azauracil (4.2 g.) and hexamethyldisilazane (11 ml.) is refluxed for two hours. The excess hexamethyl-disilazane is removed under reduced pressure and the residue distilled in vacuo.

Acetonitrile (60 ml.) and 3,5-bis-trifluoromethylbenzyl bromide (11.0 g.) is added and the mixture refluxed for 24 hours. The acetonitrile is then removed under reduced pressure, and 10 ml. of a 1:1 water-methanol solution added to the residue. The mixture is stirred, allowed to stand for an hour, then filtered to recover the crude product which precipitates. The crude product melts at 143°–150° C. It is purified by chromatography on silica gel using chloroform-acetonitrile (3:1). The product is recovered from the eluate by removal of the solvent, then recrystallized from petroleum ether; M.P. 148°–151° C.

In like manner, the following compounds are prepared. The crude products are purified by recrystallization from petroleum ether.

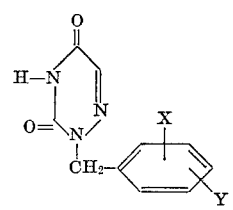

| X | Y | (0° C.) M.P. |
|---|---|---|
| H | 3-CN | 179–181 |
| H | 2-CN | 208–210 |
| H | 3-I | 206–208 |
| 3-F | 4-F | 207–208 |
| H | 4-SO$_2$CH$_3$ | 233–234 |
| 3-NO$_2$ | 4-Cl | 183–185 |
| 3,4-  | | 182–183 |

EXAMPLE IV

The coccidiostatic activity of several of the 2-benzyl-as-triazine-3,5(2H,4H) diones described herein is demonstrated as follows:

Groups of five nine-day old Barred Rock Cross strain cockerels are fed a basal ration into which the test compound is incorporated at various concentrations. The basal ration, a commercial chick starter (Purina Commercial Chick Starter, available from the Ralston Purina Co., St. Louis, Mo.), having the following composition is presented ad libitum to the chicks 24 hours before infection and continuously thereafter throughout the course of the tests.

Basal ration composition:

| | Percent |
|---|---|
| Crude protein not less than | 18.0 |
| Crude fat not less than | 3.0 |
| Crude fiber not more than | 6.0 |
| Added minerals not more than | 3.5 | supplied by the following ingredients:

Meat and bone meal, fish meal, soybean meal, ground barley, ground oats, ground yellow corn, dehydrated alfalfa meal, wheat middlings, vitamin B$_{12}$ supplement, ethoxyquin (a preservative), animal fat preserved with BHA [1], choline chloride, niacin, vitamin A supplement, riboflavin supplement, calcium pantothenate, D activated animal sterol, vitamin E supplement, menadione sodium bisulfite (source of vitamin K activity)[2], calcium carbonate, low fluorine rock phosphate, iodized salt, manganese sulfate, manganous oxide, copper sulfate, zinc oxide.

---

[1] BHA = butylated hydroxyanisole.
[2] Menadione sodium bisulfite = 2-methyl-1,4-naphthaquinone sodium bisulfite.

Twenty-four hours after initiation of the medication, the chicks are inoculated orally with 200,000 sporulated oocysts (*Eimeria tenella*) and the average weight per bird per group determined. In addition, a group of ten chicks is fed the basal ratio which contains more of the test compound (infected, untreated controls). A further group of ten chicks serves as uninfected, untreated controls. All chicks are examined on the fifth and sixth day post-infection for signs of hemorrhage. On the eighth day post-infection, the average body weight per bird per group is determined, the birds necropsied, the cecum examined macroscopically, and a pathology index (average degree of infection [A.D.I.]) determined. Chicks which die prior to the fifth day post-infection are considered as toxic deaths. Those which die five days post-infection or later are considered as deaths due to disease. The efficacy of the test compound is judged by the prevention of mortality and by comparison of the pathologic index with that of the unmedicated infected controls. The degree of pathologic involvement at necropsy is expressed as the average degree based on the following scheme: 0=no cecal lesions; 1=slight lesions; 2=moderate lesions; 3= severe lesions; 4=death.

The lowest concentration of test compound in the feed which will produce normal weight gains relative to the uninfected, untreated controls and normal pathology relative to the infected, untreated controls, referred to as the minimum effective concentration (MEC) is presented below for several compounds described herein.

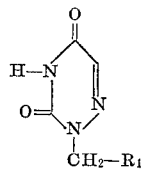

| $R_1$: | MEC, percent |
|---|---|
| phenyl | 0.0125 |
| 2-chlorophenyl | 0.0125 |
| 3-chlorophenyl | 0.006 |
| 4-chlorophenyl | 0.006 |
| 4-bromophenyl | 0.0125 |
| 2-fluorophenyl | 0.0125 |
| 3-fluorophenyl | 0.006 |
| 4-fluorophenyl | 0.006 |
| 3-iodophenyl | 0.025 |
| 3-nitrophenyl | 0.0125 |
| 4-nitrophenyl | 0.025 |
| 2-cyanophenyl | 0.05 |
| 3-cyanophenyl | 0.003 |
| 4-cyanophenyl | 0.006 |
| 3-trifluoromethylphenyl | 0.0125 |
| 4-trifluoromethylphenyl | 0.025 |
| 4-methoxyphenyl | 0.05 |
| 2,4-dichlorophenyl | 0.0125 |
| 3,4-dichlorophenyl | 0.006 |
| 5-chloro-2-fluorophenyl | 0.006 |
| 4-chloro-2-fluorophenyl | 0.0125 |
| 4-chloro-3-methoxyphenyl | 0.0125 |
| 2-chloro-4-nitrophenyl | 0.025 |
| 4-chloro-3-nitrophenyl | 0.025 |
| pentafluorophenyl | 0.006 |

In like manner, other coccidium species, such as *E. acervulina*, *E. praecox*, *E. mitis*, *E. necatrix*, *E. hagani*, and *E. brunetti*, are similarly combatted.

EXAMPLE V

Various levels of the 2-benzyl-as-triazine-3,5(2H,4H) diones of Example IV are thoroughly blended into a nutritionally balanced diet having the composition shown to provide feeds containing 0.0015%, 0.001%, 0.0025%, 0.005%, 0.01%, 0.025%, 0.05%, and 0.1%, respectively, of the active agents.

| | Percent |
|---|---|
| Ground yellow corn | 51.28 |
| Soybean oil meal (51%) | 38.15 |
| Corn oil | 6.10 |
| $CaCO_3$ | 1.20 |
| Dicalcium phosphate | 1.35 |
| Salt | 0.61 |
| Delamix (commercially available mineral mix containing $CaCO_3$ and small amounts of iron, zinc, manganese, and so forth, salts; Limestone Products Corporation of America, New Jersey) | 0.1 |
| Vitamin A (5305 I.U./lb.) | 0.1 |
| Vitamin $D_3$ (681 I.C.U./lb. | 0.05 |
| Klotogen F (commercially available form of vitamin K, Abbott Laboratories) | 0.0003 |
| Pyridoxine hydrochloride | 0.0006 |
| D.I.-methionine | 0.140 |
| Niacin U.S.P. | 0.0025 |
| Choline chloride (25%) | 0.2 |
| Riboflavin | 0.06 |
| Calcium pentothenate (45%) | 0.002 |
| Myvamix (commercially available form of vitamin E | 0.005 |

Such feeds, when administered ad libitum to nine-day old chicks and to medium-sized turkey poults infected with *E. tenella*—as described in Example IV, are effective in controlling the coccidial infection.

The remaining compounds of Examples I–III are tested in like manner with comparable results.

EXAMPLE VI

The alkali metal and alkaline earth metal salts of the compounds of Examples I–III are prepared by dissolving the compounds in an aqueous or aqueous alcohol solution containing an equivalent amount of the appropriate hydroxide; e.g., sodium, potassium, calcium, barium, strontium, magnesium hydroxides. The salts are obtained by freeze drying the reaction mixtures.

PREPARATION A 4-chloromethyl-2-nitrophenyl) ethyl sulfone

Anhydrous ethyl (2-nitro-4-tolyl)sulfone (0.4 mole) (U.S. Pat. 1,939,416 [1933]; Beilstein 6, III, 1438) containing 1% by weight of phosphorus pentachloride is heated above its melting point and irradiated with a 200-watt lamp. Chlorine gas is passed into the melt until 0.4 gram atom of chlorine is absorbed. The product is then isolated by distillation.

In like manner, the following compounds are converted to their corresponding chloromethyl derivatives:

(3-bromo-4-tolyl)methylsulfone
(5-cyano-2-tolyl)methylsulfone
(2-trifluoromethyl-5-tolyl)methylsulfone

PREPARATION B (4-chloro-2-chloromethylphenyl) methyl sulfone

To a solution containing (4-chloro-2-chloromethylphenyl)methylsulfide (Beilstein 6, III, 4544) (0.2 mole) in 300 ml. of chloroform is added, at 0° C., a solution of m-chlorobenzoic acid (0.44 mole) in 300 ml. of chloroform. The reaction mixture is stirred at room temperature for 4 hours, washed three times with dilute sodium bicarbonate solution, then with water. The chloroform solution is then dried with magnesium sulfate and concentrated to dryness. The residue is recrystallized and dried under vacuum.

By means of this procedure (5-cyano-2-tolyl)methylsulfide is oxidized to (5-cyano-2-tolyl)methylsulfone; and (2-trifluoromethyl - 5 - tolyl)methylsulfide to (2-trifluoromethyl-5-tolyl)methylsulfone.

PREPARATION C (2-trifluoromethyl-5-tolyl)methylsulfide 0.25 mole of 2-methylmercapto-p-toluic acid (German Pat. 204,763; Beilstein 10, 237) is placed in a stainless steel shaker tube under a nitrogen atmosphere and the tube cooled to Dry Ice temperature. The nitrogen is removed with a vacuum pump, and 0.60 mole of sulfur tetrafluoride then condensed into the shaker tube. The tube and contents are heated at 120° C. for 6 hours, then cooled, and vented to remove volatile components. The residue is washed with dilute sodium bicarbonate solution and the product isolated by distillation.

What is claimed is:

1. A compound of the formula

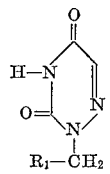

and the alkali metal and alkaline earth metal salts thereof wherein $R_1$ is selected from the group consisting of pentafluorophenyl, pentachlorophenyl, 3,4-methylenedioxyphenyl, and

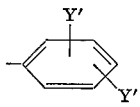

wherein

X' is selected from the group consisting of halogen, lower alkoxy, nitro, hydrogen, trifluoromethyl, and cyano; and Y' is selected from the group consisting of hydrogen, halogen, methyl, nitro, lower alkylsulfonyl, and trifluoromethyl; with the proviso that when X' is hydrogen, Y' is lower alkylsulfonyl.

2. The compound of claim 1 wherein $R_1$ is

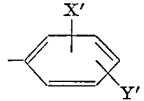

wherein each of X' and Y' is halogen.

3. The compound of claim 1 wherein $R_1$ is

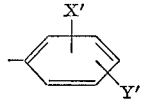

wherein X' is hydrogen and Y' is halogen.

4. The compound of claim 1 wherein $R_1$ is

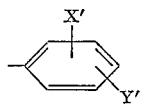

wherein X' is cyano and Y' is halogen.

5. The compound of claim 2 wherein each of X' and Y' is chloro.

6. The compound of claim 3 wherein X' is hydrogen and Y' is chloro.

7. The compound of claim 4 wherein X' is 3-cyano.

8. The compound of claim 5 wherein X' is 3-chloro and Y' is 4-chloro.

9. The compound of claim 6 wherein Y' is 3-chloro.

References Cited

Novacek et al.: Coll. Czech. Chem. Commun., vol. 30, pp. 3890–4 (1965).

Slouka: Monatsh. Chem., vol. 96, pp. 134–7 (1965).

JOHN M. FORD, Primary Examiner

U.S. Cl. X.R.

424—249; 99—4